(No Model.)
F. TAGGART.
MACHINE FOR DISINTEGRATING GRAIN AND OTHER SUBSTANCES.
No. 256,072. Patented Apr. 4, 1882.
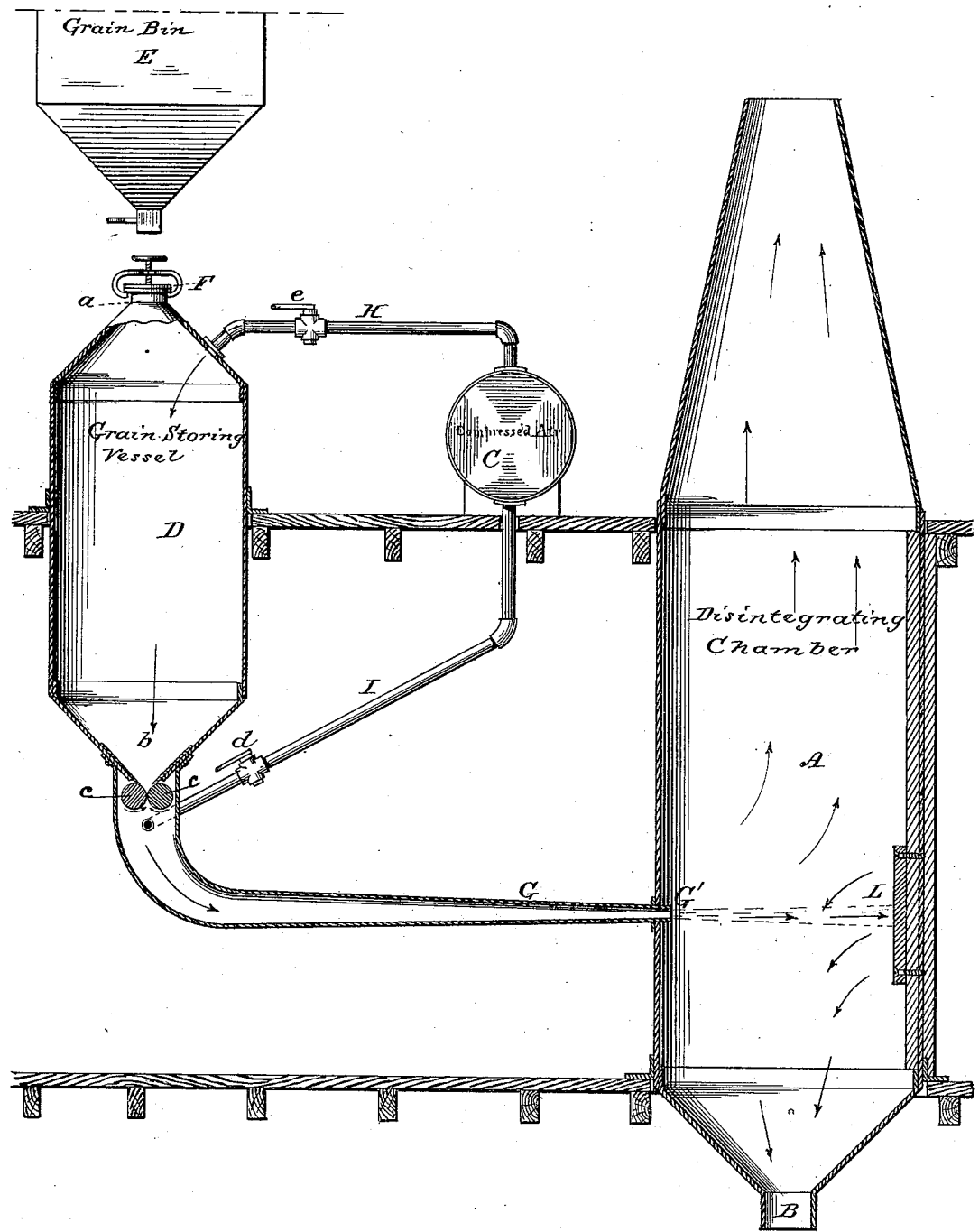
Attest:
H. D. Pennie
Floyd Norris
Inventor:
Francis Taggart
By Johnson & Johnson
Atty's.

United States Patent Office.

FRANCIS TAGGART, OF BROOKLYN, NEW YORK, ASSIGNOR TO CHARLES R. KNICKERBOCKER, TRUSTEE.

MACHINE FOR DISINTEGRATING GRAIN AND OTHER SUBSTANCES.

SPECIFICATION forming part of Letters Patent No. 256,072, dated April 4, 1882.

Application filed May 25, 1880. (No model.)

*To all whom it may concern:*

Be it known that I, FRANCIS TAGGART, a citizen of the United States, residing at Brooklyn, in the county of Kings and State of New York, have invented new and useful Improvements in Machines for Disintegrating Grain and other Substances, of which the following is a specification.

In a patent granted to me October 18, 1881, No. 248,528, for improvement in process and apparatus for disintegrating wheat, &c., I have described and claimed a process for disintegrating cereals and other frangible substances, and an apparatus for carrying the process into effect. The said process, in brief, consists in forcibly projecting the grains to be comminuted against a hard abutment or obstacle by the agency of a continuously-flowing powerful current of aeriform fluid, (usually compressed air,) into which the grains are introduced at a convenient point, whereby the latter are disintegrated, and then collecting into one channel the comminuted particles, while the accumulation of air is permitted to escape at a different point.

My present improvement is to effect the same object or purpose; and it consists in features of construction and of combination of apparatus or mechanism specially adapted for effecting the disintegration of the substance to the desired degree of fineness of granules and its collection. In this apparatus the grain or other frangible substance to be reduced is stored in an air-tight vessel, from which it is delivered in regulated quantities by a positively-moving feed into and from a fixed ejector or projecting pipe within a suitable chamber or case by means of a jet of air, the said ejector being connected with the open end of said storing-vessel, and connected also with a chamber within which air is compressed, communicating with the closed end of said storing-vessel, the said ejector being also connected with the receiving-chamber, whereby the substance is continuously projected against the abutment from a closed supplying-chamber into an open receiving-chamber, wherein the substance and its impelling air-jet are separated and the product of the reduction collected.

I have illustrated in the accompanying drawing one form of apparatus or mechanism embracing my present improvements, and which represents a vertical sectional view of the organized apparatus in its relation to the floors of a mill.

The grain or other substance is projected into a chamber, A, wherein it is disintegrated to the desired measure by a single impingement and the shattered particles confined and discharged therefrom. This chamber may be of any suitable form, size, and construction, and arranged in relation to bolting and sifting machines to separate the bran-skins from the granular flour-producing substance, and to suitable flour-producing apparatus, all of which may or may not be connected to and communicate with the discharge chute or spout B, which I prefer to form as a continuation of a hopper-bottom of said chamber.

A chamber, C, serves to receive air under accumulated pressure, and should be of capacity to afford a steady pressure and supply of compressed air to the ejector. Its strength should be sufficient to bear with safety a pressure of two hundred and twenty-five pounds (more or less) to the square inch. This pressure-chamber has connection not only with the ejector-tube, but with a vessel, D, within which the grain or substance is stored, and from which it is delivered or fed to the ejector. This vessel D is of cylindrical or other form and of proper capacity, and is made air-tight and of strength sufficient to bear with safety a pressure of two hundred and twenty-five pounds (more or less) to the square inch, and is designed to receive the grain or other substance to be disintegrated from a bin, E, which forms also a hopper arranged to direct the grain into said storing-vessel. The bin, however, does not join the storing vessel or cylinder, but is separated from it a sufficient distance to allow the receiving opening or neck $a$ of said vessel, when filled, to be closed by a suitable cover or cap, F, to render it air-tight and form its closed end.

A shifting pipe or nozzle attached to the bin may be used to fill the vessel. This vessel is formed with a suitable hopper discharge end, $b$, for the grain or substance. Rolls $c$ $c$, of suitable diameter, are arranged to effect the feed from the vessel D in regulated quantities, and they are preferably adapted to be revolved upward, or in a direction contrary to the feed. These feed-rolls are provided with slides or scrapers secured to the inclined sides of the hopper end of the vessel D, and they are adjustable in relation to the rolls.

In the operation of the apparatus the storing-vessel is practically air-tight, and the feed of the grain or substance therefrom is not only effected in quantities regulated by the adjustment and speed of the rolls, but by the impelling force of compressed air entering said vessel above the substance and pressing it upon the revolving surfaces of the rolls. In disintegrating grain or particles by the prime impact of the kernels or substances against an abutment or surface of impingement, it is a matter of great advantage that the feed should be such that the grain will be projected with regularity as to body or volume to produce the best results, and I find a feed of positively-moving surfaces to give good results.

The projecting pipe G forms the ejector G' proper and extends from the hopper end of the closed storing-vessel and enters the open chamber A, in which the disintegration is effected. This ejector-pipe has its largest diameter at its junction with the storing-vessel, and tapers therefrom in a proper manner to form the ejector.

The compressed-air chamber communicates with the vessel D, in which the grain or substance is stored, by a pipe, H, entering its top or upper portion, and by a similar pipe, I, said compressed-air chamber communicates with the projecting pipe or ejector G at or near its junction with said vessel for the purpose of delivering the air under high compression, not only into the air-tight vessel upon the grain or substance therein to force it through the feed-rolls, but into the ejector-tube below said feed-rolls to force the grain or substance through said ejector.

Supported upon the wall of the case or chamber A, opposite to the entrance therein of the ejector-pipe, in central line therewith and at right angles thereto, is a disk, L, of a suitable diameter and thickness, of extremely hard steel or other hard and proper substance, with preferably a polished surface of any form, broken or unbroken, forming an abutment or surface of impingement against which the grain kernels or substances are projected with force sufficient to cause the whole interior substance of the kernels to be disintegrated to the desired measure by destruction of their momentum, in which action, without abrasion, and consequently without pulverization, the bran-skins, which are fibrous, are broken through and the resulting granules discharged therefrom.

The shattered particles are confined within and fall and pass out from the chamber in which the abutment is arranged. This chamber is so constructed as to allow sufficient freedom for the outward passage of the expanded air from the ejector, while retaining in the chamber all, or nearly all, the products of disintegration, whether such provision be made by the use of a large and high inclosure of pyramidal or conical form, and having sufficient capacity to allow of a very slow ascent of the liberated air to the small outlet at the top, thus giving time for the subsidence of the fine and lighter products of the disintegration, or by forming the inclosing walls or surrounding surfaces of the chamber of bunting or other pervious fibrous fabric, or of perforated metal of such size of mesh or perforations as to allow the air to pass outward, while retaining within the chamber nearly or quite all of the fine products of disintegration.

It is an important matter that the pipe I, leading from the compressed-air chamber to the grain-projecting pipe or ejector, should be of such size as will give the same pressure at the point of connection with the ejector-pipe as within the said chamber at the point of connection therewith; and this pipe and the one leading from said chamber to said cylinder are provided with suitable cocks or valves, $d$ and $e$, by which to regulate and control the operation.

The apparatus is suitably supported, and the supply of compressed air in the chamber C is maintained by any suitable means.

The apparatus being completed for use, the vessel D is filled from the bin and is closed by the air-tight cover. The chamber C having been fully charged with compressed air, the cocks $d$ and $e$ in the pipes H I are then opened to admit compressed air from the chamber C into the cylinder D, which is filled with grain, and into the ejector-pipe G, through which the grain is projected from said cylinder or storing-vessel. The feed-rolls are then caused to be rotated by any suitable power-connections, being regulated until the maximum quantity of grain or other substance which can be projected through the ejector against the fixed abutment shall be determined. The operation then continues until all the grain shall have been discharged from the cylinder. The cocks are then closed to cut off the air-pressure, the feeding-rolls are stopped, and the cap being removed from the storing vessel or cylinder, it is again filled from the bin and the operation is then continued.

A suitable blower or air-compressor with proper ejector-connections may be used instead of the compressed-air chamber.

I claim—

1. The combination, in apparatus for pulverizing or reducing grain and other frangible substances, with an ejector, a hard abutment, and a chamber inclosing said abutment and ejector-orifice, of an air-tight storing and supplying vessel, a positively-moving feed, and a chamber filled with air under high compression communicating with said air-tight vessel above the substance, and with the ejector-pipe under said positively-moving feed, substantially as set forth.

2. In apparatus for reducing or pulverizing grain and other frangible substances, the combination, with an air-tight storing and supplying vessel, a chamber within which compressed air is stored, an ejector, a hard abutment, and a chamber inclosing said abutment and ejector-orifice, of feed-rolls arranged to deliver the substance under pressure in regulated quantities from said air-tight supplying-vessel, substantially as described.

3. In apparatus for disintegrating grain and other frangible substances, the combination, with an air-tight storing and supplying chamber, D, of a chamber, A, open at top and bottom, a chamber, C, for compressed air, an ejector, G', a hard abutment, L, a positively-moving feed device, c c, arranged within the ejector-pipe, tapering from its junction with the storing-vessel to and forming the ejector-orifice G', and the valved pipes H I, substantially as described.

In testimony whereof I have hereunto set my hand in the presence of two subscribing witnesses.

FRANCIS TAGGART.

Witnesses:
  A. E. H. JOHNSON,
  J. W. HAMILTON JOHNSON.